G. S. GRAHAM.
FREIGHT CAR.
APPLICATION FILED JAN. 9, 1917.

1,289,735.

Patented Dec. 31, 1918.

Witness:
Robt R Kitchel.

Inventor:
George S. Graham,
BY
Augustus B. Stoughton
Attorney

UNITED STATES PATENT OFFICE.

GEORGE S. GRAHAM, OF PHILADELPHIA, PENNSYLVANIA.

FREIGHT-CAR.

1,289,735.　　　　　Specification of Letters Patent.　　Patented Dec. 31, 1918.

Application filed January 9, 1917.　Serial No. 141,353.

*To all whom it may concern:*

Be it known that I, GEORGE S. GRAHAM, a citizen of the United States, residing at Philadelphia, in the county of Philadelphia and State of Pennsylvania, have invented a certain new and useful Freight-Car, of which the following is a specification.

The principal object of the present invention is to facilitate the rail transportation and unloading of grain and to this and other ends hereinafter set forth the invention, generally stated, consists in a hopper top freight car from which grain can be easily dumped by inverting the car, and which may be provided with tight side doors well adapted to retain the mobile mass of grain and also useful in other connections and which, if desired, can be filled to the limit of its capacity.

From embodiments of the invention I have selected one for illustration in the accompanying drawings in which—

Figure 1:
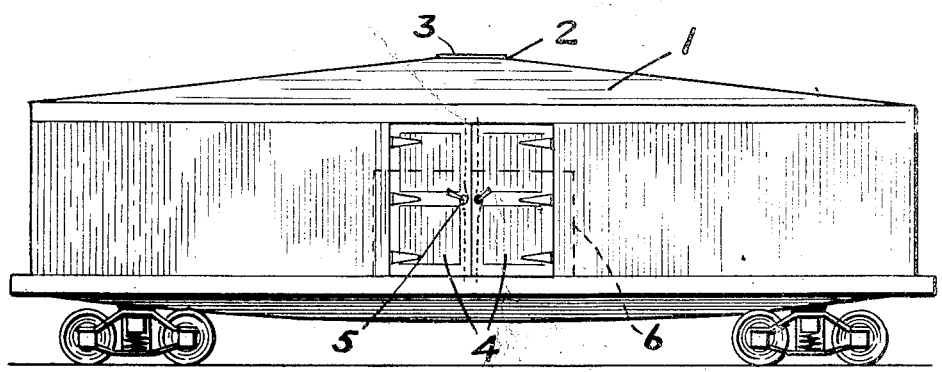
Figure 1, is a side view of a car embodying features of the invention.
Figure 2:
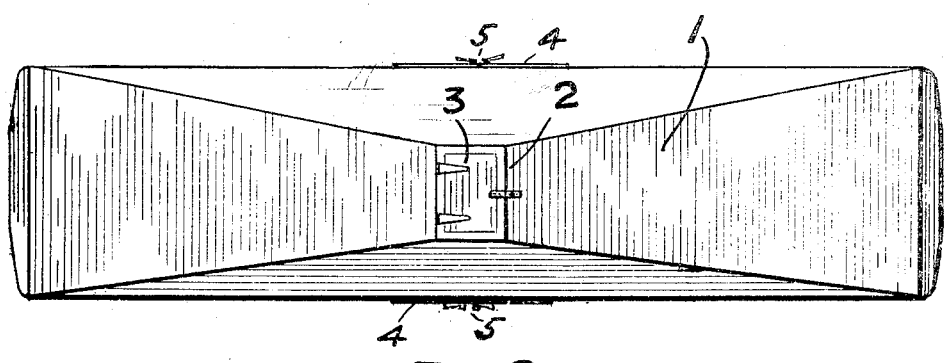
Fig. 2, is a top or plan view of the same.
Figure 3:
Fig. 3, is a detail sectional view drawn to an enlarged scale.
Figure 4:
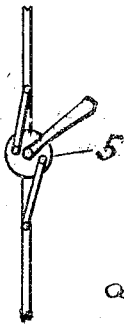
Fig. 4, is a detail view of one of the parts shown in Figs. 1 and 3.

A freight car embodying features of the invention is provided at the top with an inverted hopper, and a feature of the invention is the ease with which the grain can be dumped when the car is inverted. In the drawings, 1, is an inverted hopper having its throat 2, at the top. By showing one inverted hopper I do not intend to exclude the use of two or even more inverted hoppers. In the present instance the inverted hopper is also the roof of the car, thus providing full capacity for the car, but a roof can be put on top of the inverted hopper as will be readily understood by those skilled in the art; in any event due regard in outside dimensions must be had to railroad specifications to avoid tunnels, bridges and other obstructions. 3, is a hatch which, when present, serves to close the throat of the hopper and complete the roof of the car. 4, are side doors which, as shown, are adapted to close tight. They are of the hinge variety and are provided with bolt fastenings 5.

In use the car may be loaded with grain from above and through the mouth of the inverted hopper. If the car is to be used only in the grain trade and unloaded only at terminals provided with means for bodily inverting the cars, side doors may be dispensed with, but when the cars are used for general freight or the grain is sometimes to be unloaded at points which are not provided with car inverting facilities, they should be provided with side doors and these can be of the hinged and tight variety well adapted to prevent loss of grain by leakage, for grain by reason of its mobility is bad freight. When the side doors are present they can be closed during loading and are closed during dumping. In this way the cars can be loaded to their carrying capacity, or substantially full, if they are made sufficiently strong to avoid side-swipes. In the absence of side doors, or if the latter are of the tight-closing variety, waste of grain by leakage is avoided. If the grain is to be unloaded through the side doors, false doors or planks 6, may be used to limit the outrush of grain, or this can be accomplished by properly limiting the opening of the hinge door, or, if unobjectionable, it may be permitted to occur. In any event the car can be more conveniently and, if desired, more fully loaded from the top than through the side doors. One of the most important features of the invention is the facility with which the grain can be dumped when the car is inverted, and this is due to the inverted hopper at the top of the car, but this same feature of construction and arrangement makes possible other advantages of which some have been mentioned and of which others are obvious to those skilled in the art. To unload a grain car through its side doors presents difficulties which are well understood and requires a great deal of time and labor, and often entails waste but by my invention these difficulties are avoided and much time and labor are saved and waste avoided.

Modifications and changes may be made in details of construction and arrangement without departing from the spirit of the invention, hence I do not limit myself to such matters but what I claim is:

1. A freight car having a generally rectangular interior box-like in its adaptability for freight and having at its top an inverted hopper through which grain can be dumped by inversion of the car to easily 5 unload it, substantially as described.

2. A freight car having a generally rectangular interior box-like in its adaptability for freight and having side doors and provided at its top with an inverted hopper having at its throat a hatch, substantially as 10 described.

GEO. S. GRAHAM.